United States Patent [19]

Miki

[11] Patent Number: 4,737,924
[45] Date of Patent: Apr. 12, 1988

[54] DOT MATRIX TYPE SERIAL PRINTER

[75] Inventor: Yasuhiro Miki, Nagoya, Japan

[73] Assignee: Brother Industries, Ltd., Nagoya, Japan

[21] Appl. No.: 763,473

[22] Filed: Aug. 7, 1985

[30] Foreign Application Priority Data

Aug. 21, 1984 [JP] Japan ................................ 59-174719

[51] Int. Cl.⁴ ............................................. G06F 15/46
[52] U.S. Cl. .................................... 364/519; 400/322; 400/582; 318/603
[58] Field of Search ....................... 364/518, 519, 521; 400/322, 323, 568, 582, 584, 902; 318/594, 603; 346/14 DH

[56] References Cited

U.S. PATENT DOCUMENTS

| 4,091,911 | 5/1978 | Chang et al. | 364/519 X |
| 4,261,039 | 4/1981 | Baker et al. | 364/519 |
| 4,326,813 | 4/1982 | Lomicka, Jr. et al. | 400/322 X |
| 4,591,969 | 5/1986 | Bloom et al. | 364/519 X |

Primary Examiner—Gary V. Harkcom
Assistant Examiner—H. R. Herndon
Attorney, Agent, or Firm—Kane, Dalsimer, Sullivan, Kurucz, Levy, Eisele and Richard

[57] ABSTRACT

A serial printer of a dot matrix type wherein the pitch of dots oriented in the direction in which characters are to be printed in a matrix of dots is varied in a minute amount, to thereby adjust the pitch of the characters as desired.

2 Claims, 5 Drawing Sheets

FIG. 3

| NO. | PITCH OF DOTS ORIENTED IN THE DIRECTION OF ONE LINE | FIRST FREQUENCY -DIVISION DATA UNIT | SECOND FREQUENCY -DIVISION DATA UNIT | THIRD FREQUENCY -DIVISION DATA UNIT | FOURTH FREQUENCY -DIVISION DATA UNIT | FIFTH FREQUENCY -DIVISION DATA UNIT | SIXTH FREQUENCY -DIVISION DATA UNIT | SEVENTH FREQUENCY -DIVISION DATA UNIT | EIGHTH FREQUENCY -DIVISION DATA UNIT |
|---|---|---|---|---|---|---|---|---|---|
| 1 | 1/96 | 7 | 8 | 7 | 8 | 7 | 8 | 7 | 8 |
| 2 | 1/106.7 | 6 | 7 | 7 | 7 | 6 | 7 | 7 | 7 |
| 3 | 1/137.1 | 5 | 5 | 5 | 6 | 5 | 5 | 5 | 6 |
| 4 | 1/160 | 4 | 5 | 4 | 5 | 4 | 5 | 4 | 5 |
| 5 | 1/192 | 3 | 4 | 4 | 4 | 3 | 4 | 4 | 4 |
| 6 | 1/213.3 | 3 | 4 | 3 | 3 | 3 | 3 | 4 | 3 |
| 7 | 1/274.3 | 2 | 3 | 2 | 3 | 3 | 2 | 3 | 3 |
| 8 | 1/288 | 2 | 3 | 2 | 3 | 2 | 3 | 2 | 3 |
| 9 | 1/320 | 2 | 2 | 2 | 3 | 2 | 2 | 2 | 3 |

FIG. 5

| NO. | PITCH OF DOTS ORIENTED IN THE DIRECTION OF ONE LINE | FIRST FREQUENCY-DIVISION DATA UNIT | SECOND FREQUENCY-DIVISION DATA UNIT | THIRD FREQUENCY-DIVISION DATA UNIT | FOURTH FREQUENCY-DIVISION DATA UNIT | FIFTH FREQUENCY-DIVISION DATA UNIT | SIXTH FREQUENCY-DIVISION DATA UNIT | SEVENTH FREQUENCY-DIVISION DATA UNIT | EIGHTH FREQUENCY-DIVISION DATA UNIT |
|---|---|---|---|---|---|---|---|---|---|
| 0 | 1/60 | 12 | 12 | 12 | 12 | 12 | 12 | 12 | 12 |
| 1 | 1/72 | 10 | 10 | 10 | 10 | 10 | 10 | 10 | 10 |
| 2 | 1/80 | 9 | 9 | 9 | 9 | 9 | 9 | 9 | 9 |
| 3 | 1/90 | 8 | 8 | 8 | 8 | 8 | 8 | 8 | 8 |
| 6 | 1/120 | 6 | 6 | 6 | 6 | 6 | 6 | 6 | 6 |
| 8 | 1/144 | 5 | 5 | 5 | 5 | 5 | 5 | 5 | 5 |
| 10 | 1/180 | 4 | 4 | 4 | 4 | 4 | 4 | 4 | 4 |
| 13 | 1/240 | 3 | 3 | 3 | 3 | 3 | 3 | 3 | 3 |
| 17 | 1/360 | 2 | 2 | 2 | 2 | 2 | 2 | 2 | 2 |

DOT MATRIX TYPE SERIAL PRINTER

BACKGROUND OF THE INVENTION

This invention relates to dot matrix type serial printers for printing characters of any number as desired in one line of characters of a predetermined length, and more particularly it is concerned with a dot matrix type serial printer of the type described which is capable of varying as desired the pitch of dots for forming each character in the direction in which the characters are to be printed in one line.

When printing data having a predetermined number of characters to be printed in one line is printed by means of a serial printer using a series of wires in a row for forming characters by dots in which the length of one line of characters is too short to accommodate the predetermined number of characters to be printed in one line of the printing data, it has until now been necessary to vary the pitch of the dots in the line of characters in accordance with the length of one line of characters and the number of characters to be printed in one line of the particular serial printer to be used.

Because of this, it has been the usual practice, in a serial printer of the prior art in which characters are printed in the form of a dot matrix by moving in reciprocatory movement a print head by means of a step motor or a DC motor along one line of characters to be printed, to provide pulse generating means, such as a rotary encoder, for detecting the position to which the print head moves. The pulse generating means is operative to output, as the print head moves, pulse signals in which each has a frequency divided by an integer in accordance with the length of one line of characters and the number of characters to be printed in one line of the particular serial printer, so as to produce timing signals which allow the pitch of the dots for printing characters to be adjusted to carry out dot printing satisfactorily.

In a serial printer of a timer type, it has been the usual practice to provide a timer circuit for producing timing signals, and to set the timer circuit at a predetermined time in accordance with the length of one line of characters and the number of characters to be printed in one line of the particular serial printer. After the timer circuit is started in timed relation to the commencement of the movement of the print head, a timing signal is generated by the timer circuit at each predetermined time, so as to print characters at a desired pitch of the dots in a direction in which the characters are to be printed in one line.

Some disadvantages are associated with the serial printers of the prior art noted hereinabove. The problem with which the serial printer of the type in which the frequency of each pulse signal is divided by an integer is that it is only by an integer that the frequency of each pulse signal is divided and it is impossible for this type of serial printer to print characters at various dot pitches obtained by dividing the frequency of each pulse signal by a number which is not an integer.

In the serial printer of the timer type, the timer circuit is started by a drive pulse applied to a step motor for driving the print head at the time the movement of the print head is commenced. This gives rise to the problem that, when a DC motor is used for driving the print head, it is impossible to start the timer circuit in timed relation to the commencement of the movement of the print head. Even if the timer circuit is started at the time a drive current is passed to the DC motor, the pitch of the dots oriented in the direction in which the characters are printed become non-uniform because the time at which the drive current is passed and the distance covered by the movement of the print head are not constant, thereby tending to degrade the printed characters.

SUMMARY OF THE INVENTION

This invention has been developed for the purpose of obviating the aforesaid disadvantages of the prior art. Accordingly, the invention has as its object the provision of a dot matrix type serial printer which is capable, by using a simple construction, of varying as desired the pitch of dots for forming characters in the direction in which the characters are to be printed in one line to enable any number of characters to be printed in one line of characters of a predetermined length, whereby an arbitrarily selected number of characters can be printed in one line of characters of a predetermined length.

To accomplish the aforesaid object, the invention provides a dot matrix type serial printer, in which the frequency of each timing signal generated in synchronium with the movement of the print head in a direction in which characters are to be printed in one line is divided to print characters in timed relation to each other, with means for varying by a minute amount the pitch of the dots for forming characters in the direction in which the characters are printed in one line, whereby the space between the adjacent two characters can be set at any value as desired.

In the present invention, the pitch of the dots for forming characters in the direction in which the characters are to be printed in one line is varied by a minute amount in accordance with the number of characters to be printed in one line of characters of a predetermined length. Thus, the invention enables the space between the adjacent two characters to be printed in one line to be increased or reduced as desired, to meet the condition of printing an arbitrarily selected number of characters in one line of characters of a predetermined length.

Thus, the invention provides a dot matrix type serial printer which is capable of varying as desired the pitch of the dots for forming characters in accordance with the number of characters to be printed in one line of characters of a predetermined length, so as to enable an arbitrarily selected number of characters to be printed in one line of characters of a predetermined length.

BRIEF DESCRIPTION OF THE DRAWINGS

FIG. 3 is a table of data obtained by dividing the frequencies of pulse signals for different dot pitches;

FIG. 5 is a table of data for dividing the frequency of each pulse signal by an integer.

DESCRIPTION OF THE PREFERRED EMBODIMENT

A preferred embodiment of the dot matrix type serial printer in conformity with the invention will now be described by referring to the accompanying drawings.

Figure 1:
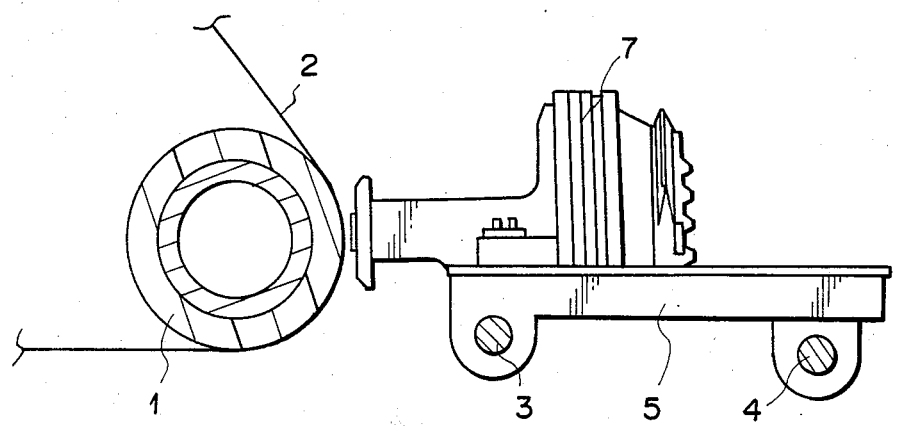
FIG. 1 is a sectional view of the dot matrix type serial printer comprising one embodiment of the invention, showing its printing mechanism.

Referring to FIG. 1, a platen 1 is rotatably supported by a main body frame, not shown, and a platen drive motor 36, such as a step motor, a DC motor, etc., subsequently to be described is drivingly connected to the platen 1. As the platen drive motor 36 is actuated, the platen 1 is driven to rotate angularly through any angle as desired either in a forward direction or in the reverse direction, to thereby feed a print sheet 2 supported thereby in a direction which is perpendicular to the direction in which characters are printed in one line on the print sheet 2.

Two guide rods 3 and 4 supported by the main body frame extend parallel to the platen 1 for supporting a carriage 5 for sliding movement axially of the rods 3 and 4. A carriage drive motor 21, such as a step motor, a DC motor, etc., subsequently to be described is drivingly connected to the carriage 5 through a timing belt, not shown, so that the carriage 5 can move on the guide rods 3 and 4 along a line of characters to be printed on the print sheet 2 any distance as desired, as the carriage drive motor 21 is actuated to drive the carriage 5.

Supported on and secured to the carriage 5 is a print head 7 which has a series of printing wires in a row and magnetic drive means, not shown, mounted therein for magnetically driving the printing wires in a row. The magnetic drive means is operative to selectively actuate the printing wires in accordance with timing signals and pattern data subsequently to be described, to print characters on the print sheet 2 in the form of a dot matrix.

A ribbon cassette of a stationary type is mounted to the main body frame and contains therein a fabric ribbon, not shown. The fabric ribbon which is folded in the ribbon cassette is trained along a printing surface of the print head 7 and fed by a ribbon drive motor 38 subsequently to be described.

Figure 2:
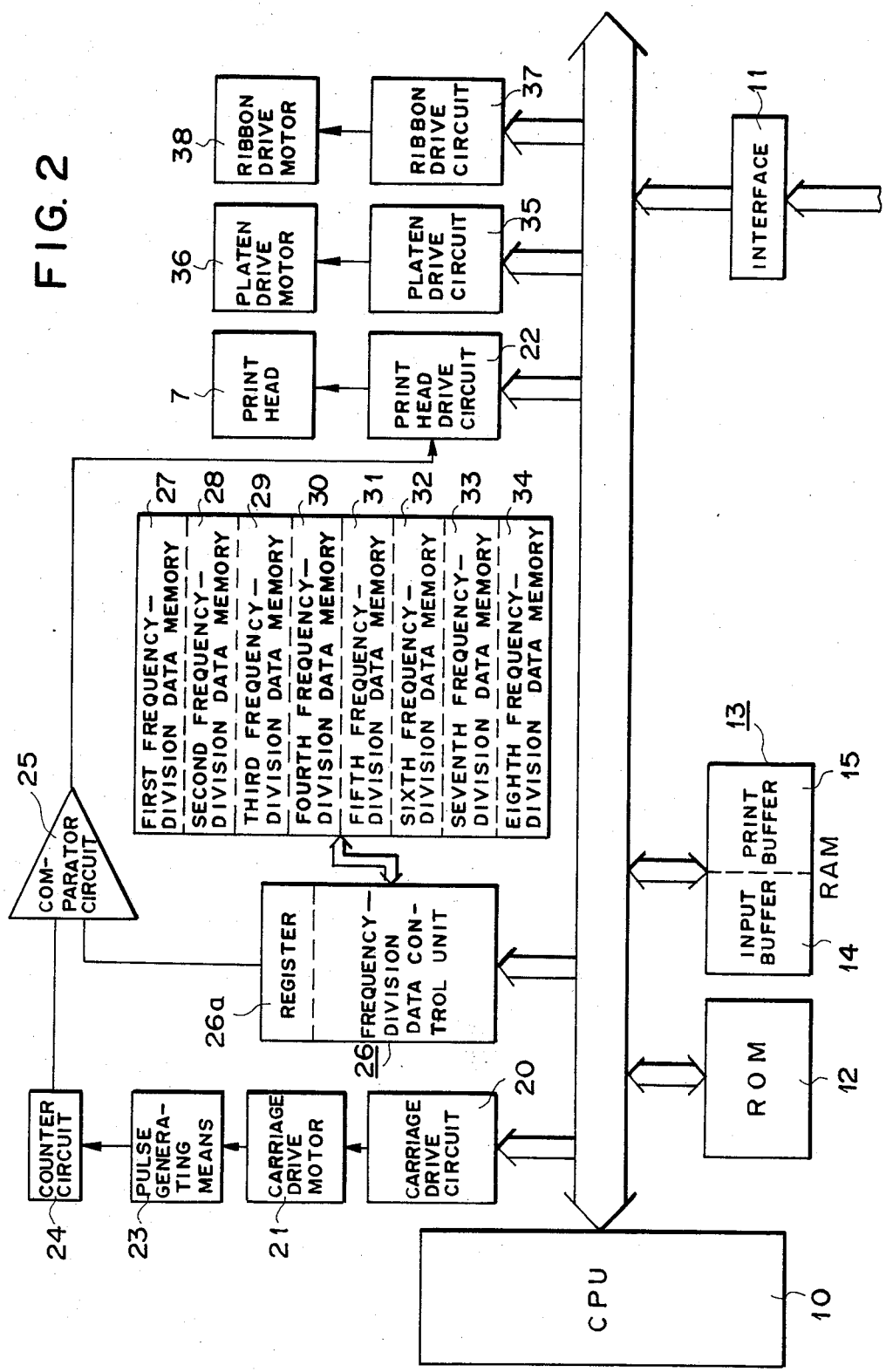
FIG. 2 is a block diagram of one example of the control circuit for electronically controlling the serial printer shown in FIG. 1.

FIG. 2 shows one example of the control circuit for the serial printer of the aforesaid construction, and FIG. 3 shows data obtained by dividing the frequencies of pulse signals for dots of different pitches oriented in the direction in which a plurality of characters are to be printed when the resolving power of pulse generating means is indicated by 1/720 in. in terms of the distance covered by the movement of the print head 7. The data obtained by dividing the frequencies of pulse signals will hereinafter be referred to as "frequency-division data."

Referring to FIG. 2, a central processing unit (CPU) 10 receiving data from external devices, not shown, such as a host computer, through an interface 11 is connected to a read-only memory (ROM) 12 and a random access memory (RAM) 13 through respective data bus. The ROM 12 stores therein pattern data of characters and symbols in conformity with various kinds of data and various kinds of programs for controlling the serial printer. The RAM 13 includes an input buffer 14 and a print buffer 15, the former storing therein data for one line of characters to be printed which is inputted thereto and the latter storing therein pattern data read out from the ROM 12 in accordance with data transferred thereto from the input buffer 14.

Connected to the CPU 10 through a data bus is a carriage drive circuit 20 to which is connected the carriage drive motor 21 referred to hereinabove. The carriage drive circuit 20 drives, based on a carriage drive signal outputted by the CPU 10, the carriage drive motor 21 for rotation to move the carriage 5 for any distance as desired along a line of characters to be printed on the print sheet 2 supported by the platen 1. A print head drive circuit 22 to which the print head 7 is connected is linked by a data bus to the CPU 10. The print head drive circuit 22 is operative, when a timing signal subsequently to be described is inputted thereto, to selectively actuate the printing wires in accordance with pattern data. Pulse generating circuit 23, such as an encoder, is connected to the carriage drive motor 21 and successively outputs pulse signals of a pulse duration conforming to the predetermined resolving power (1/720 in.) as the carriage drive motor 21 is driven for rotation. Connected to the pulse generating circuit 23 is a counter circuit 24 which outputs counter signals in accordance with the number of pulse signals inputted thereto. A comparator circuit 25 has two input terminals, one connected to the counter circuit 24 and the other connected to a frequency-division data control unit 26. Connected to the frequency-division data control unit 26 are the first to eighth frequency-division data memories 27–34 which store the first to eighth frequency-division data units, respectively, in storage positions corresponding to dots of different pitches oriented in the direction in which characters are to be printed as shown in FIG. 3. The CPU 10 is connected by a data bus to the frequency-division data control unit 26 which outputs a selection signal based on dot pitch designating data inputted by an external device. Thus, the frequency-division data control unit 26 outputs, based on the selection signal, an access signal to the first to eighth frequency-division data memories 27–34 to retrive the first to eighth frequency-division data units from their respective storage positions corresponding to the pitch of dots oriented in the direction in which characters are to be printed and transfers same to a register 26a. The comparator circuit 25 is connected to the print head drive circuit 22 and compares a counter signal with each of the first to eighth frequency-division data units. A timing signal for deciding the required dot pitch is outputted by the comparator circuit 25 to the print head drive circuit 22 when the counter signal is found to coincide with one of the frequency-division signal units. A platen drive circuit 35 is linked by a data path to the CPU 10 and has a platen drive motor 36 drivingly connected thereto. Thus, based on a platen drive signal, the platen drive circuit 35 drives the platen drive motor 36 for rotation to rotate the platen 1 through any angle as desired in one of the normal and reverse directions, to thereby feed the print sheet 2. Connected to the CPU 10 is a ribbon drive circuit 37 which drives a ribbon drive motor 38 for rotation when a ribbon drive signal is inputted thereto from the CPU 10, to thereby feed the fabric ribbon.

Figure 4:
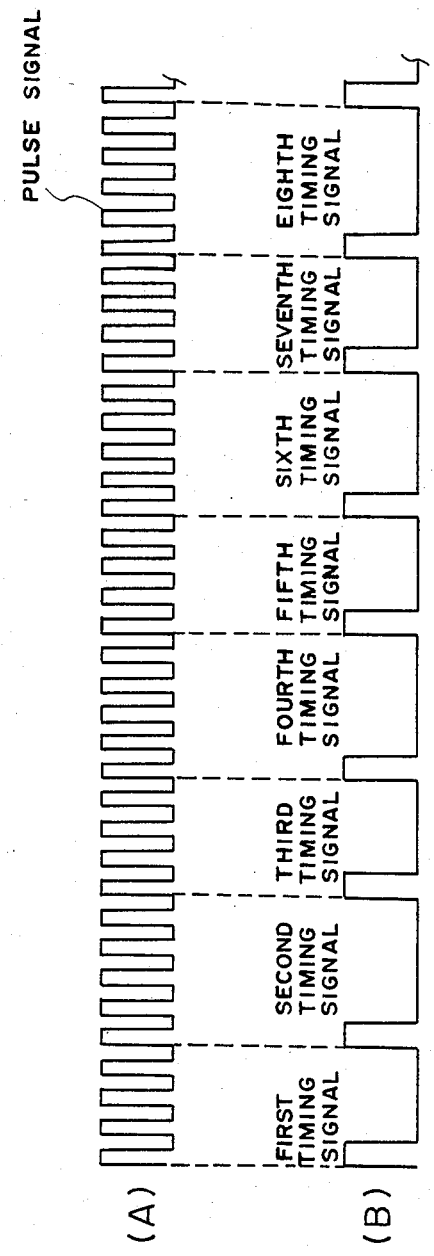
FIG. 4(A) shows the wave form of pulse signals.
FIG. 4(B) shows the wave form of timing signals corresponding to the pulse signals.

The operation of setting the dot pitch in the direction in which characters are to be printed will be described by referring to FIGS. 4(A) and 4(B).

As data is inputted from an external device, the CPU 10 gets the data stored in the input buffer 14. When a data unit for one line of characters is stored in the input buffer 14,, the CPU 10 has access to the data stored in the input buffer 14 and reads out from the ROM 12 pattern data corresponding to the data in the input buffer 14 to which access has been had and transfers same to the print buffer 15. Meanwhile, the CPU 10 outputs, in accordance with dot pitch designating data inputted from the external device, a selection signal for a dot pitch of 1/160 in., for example, in the direction in which characters are to be printed to the frequency-division data control unit 26. Upon receipt of the selection signal, the frequency-division data control unit 26 outputs an address signal to each of the first to eighth frequency-division data memories 27–34 to read out the first to eighth frequency-division data units from their positions corresponding to the dot pitch of 1/160 in. and transfer same to the register 26a.

Upon printing initiation data being inputted from the external device to the CPU 10, the latter outputs a carriage drive signal to the carriage drive circuit 20 to move the carriage 5 in one direction in which characters are to be printed in one line and outputs to the print head drive circuit 22 data pattern which is read out from the print buffer 15. As the carriage 5 moves in one direction, pulse signals are successively outputted from the pulse generating circuit 23 and the comparator circuit 25 compares the first frequency-division data (four pulses) inputted from the frequency-division data control unit 26 with the counter signals inputted from the counter circuit 24. When one of the counter-signals coincides with the first frequency-divided data (four pulses), the comparator circuit 25 outputs a first timing signal to the print head drive circuit 22 which selectively actuates, upon receipt of the first timing signal, the printing wires of the print head 7 in accordance with the pattern data, to print a row of dots. In this way, as the print head 7 moves in one direction, the comparator circuit 25 successively compares the second to the eighth frequency-division signal units inputted from the frequency-division data control unit 26 with the counter signals and successively outputs the second to eighth timing signals as a coincidence occurs between the second to eighth frequency-division data units and the counter signals outputted by the counter circuit 24. The number of pulse signals corresponding to the first to eighth frequency-division data units totals thirty-six (36). Since the first to eighth timing signals are produced while the thirty-six pulse signals are outputted, the first to eighth timing signals are produced with an average cycle of 4.5 pulses. Since the pulse generating circuit 23 has a minimum resolving power of 1/720 in., printed characters have a mean dot pitch of 1/160 in. By successively subjecting the pulse signals outputted by the pulse generating circuit 23 to frequency-division by using the first to eighth frequency-division data units, it is possible to perform the printing of characters by forming dots with a dot pitch of an average of 1/160 in. in the direction in which the characters are to be printed in a line after dividing the frequencies of the pulse signals by a number (4.5 pulses) which is not an integer.

When the printing operation performed by using the mean dot pitch of 1/160 in. is finished, the CPU 10 outputs a platen drive signal to the platen drive circuit 35 to angularly rotate the platen 1 to move the print sheet 2 to a position in which the printing of characters in the next line is to be commenced. Then, the print head 5 is moved in a direction opposite to the direction in which it was moved previously, so that the printing of characters with a mean dot pitch of 1/160 in. in the direction in which the characters are to print in a line can be performed in both direction on the print sheet 2 supported by the platen 1.

The invention has been described as being able to provide a means dot pitch of 1/160 in. in the direction in which the characters are to be printed in a line. However, the invention is not limited to this specific mean dot pitch, and dot pitches of 1/96 in., 1/106.7 in., 1/127.1 in., 1/192 in., 1/123.3 in., 1/274.3 in., 1/288 in. and 1/320 in. may also be provided by dividing the frequencies of pulse signals by numbers which are not integers. By using these dot pitches, it is possible to perform the printing of characters in the same manner as described by referring to the dot pitch of 1/160 in. That is, the first to eighth frequency-division data units are read out from the storage positions in the first to eighth frequency-division data memories 27–34 for the different dot pitches shown in FIG. 3 and the pulse signals are successively subjected to frequency-division based on the first to eighth frequency-division data units, to thereby perform the printing of characters by using any one of the dot pitches referred to hereinabove.

FIG. 3 shows the first to eighth frequency-division data units for different dot pitches obtained by dividing the frequencies of pulse signals by a number whichis not an integer. To obtain dot pitches by dividing the frequencies of pulse signals by integers, one only has to use the first to eighth frequency-division data units shown in FIG. 5.

From the foregoing description, it will be appreciated that, in the serial printer of the dot matrix type according to the invention, pulse signals outputted as the print head 7 moves are successively subjected to frequency-division based on the first to eighth frequency-division data units in accordance with a predetermined pitch of dots oriented in the direction in which characters are to be printed in one line, to provide timing signals. Based on the timing signals thus provided, characters are printed in a dot matrix form by means of wires, so that it is possible to print characters in the form of rows of dots at the pitch of dots oriented in the direction of the line of characters obtained by dividing the frequency of each pulse signal by a number which is not an integer. This makes it possible to print any number of characters as desired in a line of characters of a predetermined length.

In the embodiment of the invention described hereinabove, the CPU 10 outputs a selection signal to the frequency-division data control unit 26 based on dot pitch designating data inputted by an external device to the CPU 10, and reads out the first to eighth frequency-division data units from the storage positions in the first to eighth frequency-division data memories 27–34 for the specific dot pitch, so as to subject the pulse signals to frequency-division based on the frequency-division data and to print characters at a desired pitch of dots oriented in the direction of the line in which characters are to be printed. The invention is not limited to the aforesaid construction, and similar results can be obtained by providing the serial printer with a change-over switch to select a suitable pitch for the dots oriented in the direction of the line in which characters are to be printed in a manner to suit the condition of printing or by calculating a dot pitch in the direction of the line of characters based on the length of one line of characters of the serial printer and the number of data units for the line of characters inputted by an external device to provide a desired dot pitch by calculation, to output a selection signal based on the dot pitch thus obtained to the frequency-division data control unit to read out frequency-division data units from the storage positions of the frequency-division data memories for the particular dot pitch. The pulse signals are subjected to frequency-division based on the frequency-division data units, so as to obtain a timing signal for deciding the pitch of dots oriented in the direction of the line of characters.

The embodiment of the serial printer of the dot matrix type according to the invention has been described as using a series of wires in a row which are selectively actuated for printing characters by using dots. However, the invention is not limited to the specific form of embodiment described and a serial printer of the type using a heat-sensitive sheet for selectively causing a multiplicity of heat generating elements arranged in a row to print characters in dots on the heat-sensitive sheet or a serial printer of the heat-transfer printing type for selectively causing heat generating elements to generate heat to print characters on a sheet of ordinary paper by transfer-printing through a ribbon having a coat of ink thereon.

What is claimed is:

1. A dot-matrix serial printer for printing characters comprising:
    a print head which prints said characters, or portions thereof, in response to a timing signal, said characters comprising a dot matrix at a predetermined pitch;
    means to generate pulse signals in synchronization with the movement of said print head in the direction in which the characters are being printed;
    means to produce said timing signal by dividing, by a stored value, the frequency of pulse signals from said generating means; and
    means for varying said pre-determined pitch comprising:
        a central processing unit which outputs a selection signal in response to dot pitch designating data received from an external device; and
        a frequency data control unit which, in response to said selection signal, selectively reads frequency division data units from frequency division data memories corresponding to different pitches thereby providing said stored value to said timing signal producing means.

2. The dot-matrix serial printer of claim 1 wherein said timing signal producing means further includes:
    means for counting said pulse signals, and generating a counter signal; and
    means for comparing said stored value to said counter signal and producing timing signals whenever said stored value equals said counter signal.

* * * * *